Patented Oct. 21, 1952

2,614,992

UNITED STATES PATENT OFFICE 2,614,992

PAINT STRIPPING COMPOSITIONS

Abraham Mankowich, Darlington, Md., assignor to the United States of America as represented by the Secretary of the Army No Drawing. Application November 30, 1950, Serial No. 198,470

7 Claims. (Cl. 252—137)

(Granted under the act of March 3, 1883, as amended April 30, 1928; 370 O. G. 757)

The invention described in the specification and claims may be manufactured and used by or for the Government for governmental purposes without the payment to me of any royalty thereon.

This invention relates to a composition of matter for use as an alkaline soak stripper of oleoresinous phenolic formaldehyde and vinyl types of paint systems from metals. More especially, this invention relates to alkaline soak strippers of oleoresinous phenolic formaldehyde and vinyl type of paint systems from non-ferrous metals and alloys in aqueous solutions of moderate alkalinity, i. e., in solutions of pH 12.2 maximum.

The prior art as it relates to alkaline, soak-type paint strippers and to this invention in particular has been characterized by two factors: first, the strippers, with few exceptions have been very caustic solutions with a pH greater than 13; and second, phenolic formaldehyde and vinyl paint systems have not been readily and efficiently removable without resort to such expedients as the simultaneous use of electric current, in which case advantage is taken of the mechanical scrubbing action of the gases evolved as the result of the electrolysis of the stripping solution. Where alkaline strippers have been used in solutions of pH less than 13, in removing alkyd or nitrocellulose paint systems, the stripping action has been appreciably slower than with more alkaline strippers. It may be stated that prior to this invention phenolic formaldehyde and vinyl paint systems had not been considered removable by alkaline soak-type strippers regardless of the alkalinity.

The object of the present invention is, therefore, the development of a composition of matter capable of efficiently stripping oleoresinous phenolic formaldehyde and vinyl paint systems from ferrous and non-ferrous metals and alloys in aqueous solutions of pH 12.2 maximum.

I have discovered that the above-mentioned objective can be obtained by the addition to a mixture of alkaline salt detergents and corrosion inhibitor of a suitable amount of an oil-soluble nitrogen-alkylated alkylene polyamine, Santomerse DT (dodecyl diethylene triamine) being an example of such a compound. I have further discovered that the stripping efficiency of the invented composition can be enhanced by using in conjunction with the polyamine a non-ionic surface-active agent of the alkylated aryl polyether alcohol type. The non-ionic surface-active agent may be either water soluble or oil soluble, examples being Triton X–100, Igepal CA–Extra High Conc., and Triton X–45. Triton X–100 is p-isooctylphenyldecapolyethylene glycol ether, corresponding to the disclosure of U. S. Patent 2,213,477 which describes same as a member of the class of alkylated aryl polyethylene glycol ethers. Igepal CA–Extra High Conc. and Triton X–45 are other compounds of the same type covered by the same patent. While the objectives of this invention are obtained preferentially with low alkalinity stripping compositions, the stripping effects can also be obtained in alkaline solutions of higher pH.

As examples of compositions illustrating this invention, the following are given.

Example I

| Component: | Percent by weight |
|---|---|
| Trisodium phosphate, $Na_3PO_4 \cdot 12H_2O$ | 79.6 |
| Sodium trisilicate | 10.8 |
| Potassium chromate, $K_2CrO_4$ | 0.2 |
| Santomerse DT | 4.7 |
| Triton X–45 | 4.7 |

This composition is used at a concentration of 9.5 percent weight to volume at a boil.

Example II

| Component: | Percent by weight |
|---|---|
| Trisodium phosphate, $Na_3PO_4 \cdot 12H_2O$ | 83.7 |
| Sodium trisilicate | 11.1 |
| Potassium chromate | 0.2 |
| Santomerse DT | 5.0 |

This composition is used as in Example I.

Example III

| Component: | Percent by weight |
|---|---|
| Trisodium phosphate, $Na_3PO_4 \cdot 12H_2O$ | 79.6 |
| Sodium trisilicate | 10.8 |
| Santomerse DT | 4.8 |
| Igepal CA–Extra High Concentration | 4.8 |

This composition is used as in Example I. The sodium trisilicate used in the above examples is the equivalent of "G" Brand sodium silicate manufactured by the Philadelphia Quartz Company and contains approximately 19.4% $Na_2O$, 62.5% $SiO_2$ and 17.5% $H_2O$. It will be evident to those skilled in the art that this invention is not limited to the details of the foregoing illustrative examples, and that changes can be made in the types and amounts of the alkaline salts and corrosion inhibitor without departing from the scope of this invention. The permissible ranges of the polyamine and non-ionic surface-active agent are as follows:

| | Percent by weight |
|---|---|
| Santomerse DT | 2.5 to 10.0 |
| Non-ionic surface-active agent | 0 to 15.0 |

I claim:

1. A paint stripping composition comprising

| Component: | Percent by weight |
|---|---|
| Trisodium phosphate ($Na_3PO_4 \cdot 12H_2O$) | 79.6 |
| Sodium trisilicate | 10.8 |
| Potassium chromate ($K_2CrO_4$) | 0.2 |
| Dodecyl diethylene triamine | 4.7 |
| A non-ionic alkylated aryl polyethylene glycol ether surface active agent | 4.7 |

2. A paint stripping composition comprising

| Component: | Percent by weight |
|---|---|
| Trisodium phosphate | 83.7 |
| Sodium trisilicate | 11.1 |
| Potassium chromate | 0.2 |
| Dodecyl diethylene triamine | 5.0 |

3. A paint stripping composition comprising

| Component: | Percent by weight |
|---|---|
| Trisodium phosphate | 79.6 |
| Sodium trisilicate | 10.8 |
| Dodecyl diethylene triamine | 4.8 |
| A non-ionic alkylated aryl polyethylene glycol ether surface active agent | 4.8 |

4. A paint stripping composition comprising from about 2.5 to 10 per cent by weight of dodecyl diethylene triamine and up to 15 per cent by weight of a non-ionic alkylated aryl polyethylene glycol ether surface active agent the remainder of said composition consisting essentially of a mixture consisting of a major proportion of trisodium phosphate and the balance being sodium trisilicate.

5. An aqueous solution comprising about 10 per cent by weight of the composition of claim 4.

6. A composition according to claim 4, containing a corrosion inhibitor.

7. A composition according to claim 4, wherein said alkylated aryl polyethylene glycol ether is p-iso-octyl phenyldecapolyethylene glycol ether.

ABRAHAM MANKOWICH.

REFERENCES CITED

The following references are of record in the file of this patent:

UNITED STATES PATENTS

| Number | Name | Date |
|---|---|---|
| 1,962,821 | Kochs | June 12, 1934 |
| 2,213,477 | Steindorff | Sept. 3, 1940 |
| 2,267,205 | Kyrides | Dec. 23, 1941 |

OTHER REFERENCES

Bennett—Chemical Formulary—vol. VI (1943), pp. 483, 484.